(12) United States Patent
Vargas et al.

(10) Patent No.: US 11,715,103 B2
(45) Date of Patent: Aug. 1, 2023

(54) SYSTEMS AND METHODS FOR CHIP-BASED IDENTITY VERIFICATION AND TRANSACTION AUTHENTICATION

(71) Applicant: Capital One Services, LLC, McLean, VA (US)

(72) Inventors: Cruz Vargas, Alexandria, VA (US); Michael Mossoba, Arlington, VA (US); Jeffrey Rule, Chevy Chase, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 233 days.

(21) Appl. No.: 16/991,756

(22) Filed: Aug. 12, 2020

(65) Prior Publication Data

US 2022/0051250 A1 Feb. 17, 2022

(51) Int. Cl.
| | | |
|---|---|---|
| *G06Q 20/34* | (2012.01) | |
| *G06Q 20/40* | (2012.01) | |
| *H03K 3/03* | (2006.01) | |
| *H05K 13/00* | (2006.01) | |
| *H03K 5/156* | (2006.01) | |
| *G06K 19/00* | (2006.01) | |

(52) U.S. Cl.
CPC ....... *G06Q 20/4014* (2013.01); *G06K 19/005* (2013.01); *G06Q 20/341* (2013.01); *H03K 3/03* (2013.01); *H03K 5/156* (2013.01); *H05K 13/00* (2013.01)

(58) Field of Classification Search
CPC ............. G06Q 20/4014; G06Q 20/341; G06K 19/005; H03K 3/03; H03K 3/156; H05K 13/00
See application file for complete search history.

(56) References Cited

U.S. PATENT DOCUMENTS

| | | | |
|---|---|---|---|
| 4,079,646 A | 3/1978 | Morishita | |
| 4,192,449 A | 3/1980 | Tippetts | |
| 4,297,566 A | 10/1981 | Ahmann | |

(Continued)

FOREIGN PATENT DOCUMENTS

| | | | | |
|---|---|---|---|---|
| CN | 108365857 B | * 10/2020 | ........... | H04B 1/3816 |
| DE | 19606789 C2 | * 7/1998 | ........... | G06K 19/077 |

(Continued)

*Primary Examiner* — Bruce I Ebersman
*Assistant Examiner* — Matthew Cobb
(74) *Attorney, Agent, or Firm* — Hunton Andrews Kurth LLP

(57) ABSTRACT

Example embodiments of systems, methods, and computer-accessible mediums for identity verification and transaction authentication are provided. An exemplary system can comprise an application, a user device, and a server. The application can prompt a removal of a card chip, prompt an insertion of the card chip into the user device, determine an orientation of the card chip after the insertion of the card chip into the user device, and transmit, to the card chip, a first message. The card chip can encrypt the first message via one or more authentication protocols to generate an encrypted first message, transmit, to the server, the encrypted first message. The server can decrypt the encrypted first message, verify the decrypted first message, and transmit a second message to the application, wherein the application is configured to display a verification notification in response to the second message.

20 Claims, 9 Drawing Sheets

(56) References Cited

U.S. PATENT DOCUMENTS

| | | |
|---|---|---|
| 4,359,632 A | 11/1982 | Fisher |
| 4,360,727 A | 11/1982 | Lehmann |
| 4,398,902 A | 8/1983 | Mangum |
| 4,409,471 A | 10/1983 | Aigo |
| 4,431,911 A | 2/1984 | Rayburn |
| 4,441,391 A | 4/1984 | Seaman |
| 4,447,716 A | 5/1984 | Aigo |
| 4,485,298 A | 11/1984 | Stephens et al. |
| 4,503,323 A | 3/1985 | Flam |
| 4,506,148 A | 3/1985 | Berthold et al. |
| 4,511,796 A | 4/1985 | Aigo |
| 4,563,575 A | 1/1986 | Hoppe et al. |
| 4,589,687 A | 5/1986 | Hannon |
| 4,593,384 A | 6/1986 | Kleijne |
| 4,605,845 A | 8/1986 | Takeda |
| 4,625,102 A | 11/1986 | Rebjock et al. |
| 4,637,544 A | 1/1987 | Quercetti |
| 4,727,246 A | 2/1988 | Hara et al. |
| 4,772,783 A | 9/1988 | Ono et al. |
| 4,775,093 A | 10/1988 | Lin |
| 4,795,895 A | 1/1989 | Hara et al. |
| 4,805,797 A | 2/1989 | Natori |
| 4,819,828 A | 4/1989 | Mirabel |
| 4,835,843 A | 6/1989 | Wendt et al. |
| 4,960,983 A * | 10/1990 | Inoue ............ G06K 7/10336 235/492 |
| 4,987,683 A | 1/1991 | Brych |
| 4,999,601 A | 3/1991 | Gervais |
| 5,105,073 A | 4/1992 | Kovach et al. |
| 5,281,795 A | 1/1994 | Harlan |
| 5,288,979 A | 2/1994 | Kreft |
| 5,303,472 A | 4/1994 | Mbanugo |
| 5,331,139 A | 7/1994 | Lee |
| 5,341,923 A | 8/1994 | Arasim |
| 5,376,778 A | 12/1994 | Kreft |
| 5,416,423 A | 5/1995 | De Borde |
| 5,424,522 A | 6/1995 | Iwata |
| 5,518,171 A | 5/1996 | Moss |
| 5,529,174 A | 6/1996 | McQueeny |
| 5,531,145 A | 7/1996 | Haghiri-Tehrani |
| 5,545,884 A | 8/1996 | Seto et al. |
| 5,557,089 A | 9/1996 | Hall et al. |
| 5,569,898 A | 10/1996 | Fisher et al. |
| 5,600,175 A | 2/1997 | Orthmann |
| 5,703,350 A | 12/1997 | Suhir |
| 5,775,516 A | 7/1998 | McCumber et al. |
| 5,779,055 A | 7/1998 | Lacy, III |
| 5,782,371 A | 7/1998 | Baerenwald et al. |
| 5,796,085 A | 8/1998 | Bleier |
| 5,836,779 A | 11/1998 | Vogler |
| 5,837,153 A | 11/1998 | Kawan |
| 5,852,289 A | 12/1998 | Masahiko |
| 5,861,662 A | 1/1999 | Candelore |
| 5,905,252 A | 5/1999 | Magana |
| 5,949,060 A | 9/1999 | Schattschneider et al. |
| 5,984,179 A | 11/1999 | May |
| 6,020,627 A | 2/2000 | Fries et al. |
| 6,041,998 A | 3/2000 | Goldberg |
| 6,073,856 A | 6/2000 | Takahashi |
| 6,094,831 A | 8/2000 | Shigyo |
| 6,095,423 A | 8/2000 | Houdeau et al. |
| 6,105,872 A | 8/2000 | Lotz |
| 6,109,439 A | 8/2000 | Goade, Sr. |
| 6,149,064 A | 11/2000 | Yamaoka et al. |
| 6,186,402 B1 | 2/2001 | Johnson |
| 6,196,594 B1 | 3/2001 | Keller |
| 6,224,108 B1 | 5/2001 | Klure |
| 6,230,977 B1 | 5/2001 | Johnson |
| 6,308,832 B1 | 10/2001 | Pirro et al. |
| 6,364,114 B2 | 4/2002 | Glassman |
| 6,371,364 B1 | 4/2002 | Maillot et al. |
| 6,386,459 B1 | 5/2002 | Patrice et al. |
| 6,424,029 B1 | 7/2002 | Giesler |
| 6,439,613 B2 | 8/2002 | Klure |
| 6,443,041 B1 | 9/2002 | Pirovano et al. |
| 6,488,152 B1 | 12/2002 | Steffann |
| 6,543,809 B1 | 4/2003 | Kistner et al. |
| 6,568,593 B2 | 5/2003 | Hetzer |
| 6,571,953 B2 | 6/2003 | Sherline et al. |
| 6,593,167 B2 | 7/2003 | Dobashi et al. |
| 6,601,329 B2 | 8/2003 | Vaudreuil |
| 6,629,637 B1 | 10/2003 | Von Der Lippe et al. |
| 6,651,891 B1 | 11/2003 | Zakel et al. |
| 6,729,538 B2 | 5/2004 | Farquhar |
| 6,742,117 B1 | 5/2004 | Hikita et al. |
| 6,843,408 B1 | 1/2005 | Agren |
| 7,000,774 B2 | 2/2006 | Bryant |
| 7,003,678 B2 | 2/2006 | Ikefuji et al. |
| 7,080,776 B2 | 7/2006 | Lewis et al. |
| 7,143,935 B2 | 12/2006 | Marta |
| 7,175,085 B2 | 2/2007 | Oguchi |
| 7,207,107 B2 | 4/2007 | Usner et al. |
| 7,299,968 B2 | 11/2007 | Mittmann et al. |
| 7,311,263 B2 | 12/2007 | Eichler et al. |
| 7,360,711 B2 | 4/2008 | Jung et al. |
| 7,559,468 B2 | 7/2009 | Kawaguchi |
| 7,699,225 B2 | 4/2010 | Horiguchi et al. |
| 7,806,340 B2 | 10/2010 | Daio et al. |
| 7,844,255 B2 | 11/2010 | Petrov et al. |
| 7,868,441 B2 | 1/2011 | Eaton et al. |
| 7,931,148 B2 | 4/2011 | Hansen et al. |
| 8,006,834 B2 | 8/2011 | Marcinkowski |
| 8,025,207 B1 | 9/2011 | Correll |
| 8,038,003 B2 | 10/2011 | Rometty et al. |
| 8,267,327 B2 | 9/2012 | Tsao et al. |
| 8,403,229 B2 | 3/2013 | McGrane |
| 8,496,183 B2 | 7/2013 | Kiyozuka |
| 8,613,389 B2 | 12/2013 | Payne |
| 8,616,373 B2 | 12/2013 | Hansen et al. |
| 8,783,549 B2 | 7/2014 | Jo |
| 8,800,768 B2 | 8/2014 | Corbat et al. |
| 8,915,434 B2 | 12/2014 | Mitchell et al. |
| 9,242,436 B1 | 1/2016 | Hallman et al. |
| 9,569,769 B2 | 2/2017 | Smith et al. |
| 9,576,161 B2 | 2/2017 | Tanaka et al. |
| 9,760,816 B1 | 9/2017 | Williams et al. |
| 9,818,049 B2 | 11/2017 | Goedee et al. |
| 2002/0046635 A1 | 4/2002 | Christen et al. |
| 2002/0070280 A1 | 6/2002 | Ikefuji et al. |
| 2002/0079372 A1 | 6/2002 | Hino |
| 2002/0174336 A1 | 11/2002 | Sakakibara et al. |
| 2003/0052033 A1 | 3/2003 | Schwester |
| 2003/0069860 A1 | 4/2003 | Berndtsson et al. |
| 2003/0164320 A1 | 9/2003 | Magnusson |
| 2003/0205624 A1 | 11/2003 | Huang et al. |
| 2004/0026520 A1 | 2/2004 | Kawai et al. |
| 2004/0079805 A1 | 4/2004 | Nagata et al. |
| 2004/0079806 A1 | 4/2004 | Ogushi |
| 2004/0123715 A1 | 7/2004 | Stuckel et al. |
| 2004/0159570 A1 | 8/2004 | Schwester |
| 2005/0103832 A1 | 5/2005 | Correll |
| 2005/0127166 A1 | 6/2005 | Minemura |
| 2005/0211600 A1 | 9/2005 | Saito |
| 2005/0218027 A1 | 10/2005 | Lammers et al. |
| 2006/0016704 A1 | 1/2006 | Moskovich et al. |
| 2006/0027481 A1 | 2/2006 | Gelardi et al. |
| 2006/0044138 A1 | 3/2006 | Sin |
| 2006/0086793 A1 | 4/2006 | Oguchi |
| 2006/0091212 A1 | 5/2006 | Chien et al. |
| 2006/0118642 A1 | 6/2006 | Latka et al. |
| 2006/0266672 A1 | 11/2006 | Young |
| 2006/0273149 A1 | 12/2006 | Awano |
| 2006/0278640 A1 | 12/2006 | Watts |
| 2006/0289665 A1 | 12/2006 | Yoda |
| 2007/0051653 A1 | 3/2007 | Tilton |
| 2007/0187264 A1 | 8/2007 | Hofte et al. |
| 2007/0187273 A1 | 8/2007 | Grosskopf |
| 2007/0187835 A1 | 8/2007 | Chi |
| 2007/0193922 A1 | 8/2007 | Bacon et al. |
| 2007/0251997 A1 | 11/2007 | Brown et al. |
| 2008/0083827 A1 | 4/2008 | Ho |
| 2008/0142393 A1 | 6/2008 | Grosskopf |
| 2008/0164320 A1 | 7/2008 | Garrido-Gadea et al. |
| 2008/0251905 A1 | 10/2008 | Pope et al. |

(56) References Cited

U.S. PATENT DOCUMENTS

| | | |
|---|---|---|
| 2008/0314784 A1 | 12/2008 | Schroeder |
| 2009/0047104 A1 | 2/2009 | Jung |
| 2010/0025400 A1 | 2/2010 | Sytsma |
| 2010/0122984 A1 | 5/2010 | Kim et al. |
| 2010/0133123 A1 | 6/2010 | Thibault |
| 2010/0182020 A1 | 7/2010 | Thornley et al. |
| 2010/0206942 A1 | 8/2010 | Rometty et al. |
| 2010/0288833 A1 | 11/2010 | Santos et al. |
| 2011/0068159 A1 | 3/2011 | Yamada et al. |
| 2011/0101080 A1 | 5/2011 | Ho |
| 2011/0233098 A1 | 9/2011 | Ye et al. |
| 2011/0233099 A1 | 9/2011 | Pitt |
| 2011/0255253 A1 | 10/2011 | Campbell et al. |
| 2011/0259899 A1 | 10/2011 | McClure |
| 2011/0290675 A1 | 12/2011 | Shiue et al. |
| 2012/0048924 A1 | 3/2012 | Hong |
| 2012/0074232 A1 | 3/2012 | Spodak et al. |
| 2012/0106113 A1 | 5/2012 | Kirmayer |
| 2012/0123937 A1 | 5/2012 | Spodak |
| 2012/0126004 A1 | 5/2012 | Chen |
| 2012/0173432 A1 | 7/2012 | Yeager |
| 2012/0181158 A1 | 7/2012 | Chang |
| 2013/0024372 A1 | 1/2013 | Spodak et al. |
| 2013/0030997 A1 | 1/2013 | Spodak et al. |
| 2013/0068651 A1 | 3/2013 | Gelardi et al. |
| 2013/0068844 A1* | 3/2013 | Bosquet ........... G06K 19/07743 407/30 |
| 2013/0134216 A1 | 5/2013 | Spodak et al. |
| 2013/0233754 A1 | 9/2013 | Liu |
| 2013/0306512 A1 | 11/2013 | Smith |
| 2014/0136417 A1 | 5/2014 | Spodak et al. |
| 2014/0274641 A1 | 9/2014 | Tattersall |
| 2014/0346220 A1 | 11/2014 | Saulas |
| 2015/0108606 A1 | 4/2015 | Lamy et al. |
| 2015/0136777 A1 | 5/2015 | Baillies |
| 2015/0166218 A1 | 6/2015 | Banducci |
| 2015/0225157 A1 | 8/2015 | Nakamura et al. |
| 2016/0009473 A1 | 1/2016 | Korinek et al. |
| 2016/0031624 A1 | 2/2016 | Pascua et al. |
| 2016/0080944 A1* | 3/2016 | Colegate ................. H04L 63/06 455/410 |
| 2016/0137373 A1 | 5/2016 | Olschan et al. |
| 2016/0162712 A1 | 6/2016 | Ozawa et al. |
| 2016/0193748 A1 | 7/2016 | Luhmann |
| 2016/0229081 A1 | 8/2016 | Williams et al. |
| 2016/0272396 A1 | 9/2016 | Cataudella et al. |
| 2016/0272398 A1 | 9/2016 | Cataudella et al. |
| 2017/0344869 A1 | 11/2017 | Williams et al. |
| 2017/0351880 A1 | 12/2017 | Ozawa et al. |
| 2018/0022498 A1 | 1/2018 | Everett |
| 2018/0044051 A1 | 2/2018 | Chang |
| 2018/0079248 A1 | 3/2018 | Pascua et al. |
| 2018/0114036 A1 | 4/2018 | Spodak et al. |
| 2018/0227276 A1 | 8/2018 | Chen |

FOREIGN PATENT DOCUMENTS

| | | | |
|---|---|---|---|
| EP | 1850255 A1 | 10/2007 | |
| EP | 1710692 B1 | 9/2018 | |
| GB | 2541013 A * | 2/2017 | ............. G06F 21/34 |
| JP | 4048788 B2 * | 2/2008 | |
| WO | 2007003301 A1 | 1/2007 | |
| WO | 2007052116 A1 | 5/2007 | |
| WO | WO-2013022719 A1 * | 2/2013 | ........... G06F 21/606 |
| WO | 2013051029 A1 | 4/2013 | |
| WO | 2013112839 A1 | 8/2013 | |
| WO | 2016172449 A1 | 10/2016 | |

* cited by examiner

SYSTEMS AND METHODS FOR CHIP-BASED IDENTITY VERIFICATION AND TRANSACTION AUTHENTICATION

FIELD OF THE INVENTION

The present disclosure relates to identity verification and transaction authentication, and more particularly, to systems and methods for chip-based identity verification and transaction authentication.

BACKGROUND

Chip-based cards, such as smart cards, credit cards, and debit cards, are increasingly prevalent in all aspects of society. These cards can be involved in commercial and other transactions, such as purchases and other financial transactions. These transactions can often involve sensitive accounts or data, including financial accounts and balances, access to funds, funds transfers, and purchases or sales of goods and services. Any time a transaction is made involving financial accounts, a user's identity, or other valuable assets or information, the risk of a data breach or exposure exists and this risk can increase as the number and frequency of transactions increases. In particular, electronic transactions often require the use of private information, and as electronic transactions become an increasingly large share of commercial activity, data security risks also increase.

A conventional security measure for transactions is to require that an individual identify and/or authenticate themselves or a transaction. Either case frequently involves requiring the individual to provide private information, such as user login credentials (e.g., user login name and password), an account number, a birth date, a Social Security number, and answers to security questions that often involve non-public information known to the individual. Whenever such information is used for identification and/or authentication, this information can be exposed to identity thieves, hackers, fraudsters, and other criminals trying to gain unauthorized access to an individual's private information. If an individual's private information is compromised, identity theft, fraud, and other illegal activities can occur, which can damage the individual's finances, access to credit, and reputation. Significant expenditures of money, time, and other resources can be required to make an individual whole, or at least somewhat whole, after private information has been compromised .

Many entities do business with the private, sensitive information of individuals, including without limitation financial institutions, government agencies, and many other commercial and industrial entities. Accordingly, entities place a premium on data security, and face substantial liability if private information is exposed. The need for data security can discourage or hinder transactions, including by requiring customers or potential customers to provide private information as part of the purchases process. In addition, data security needs can increase costs and divert resources from other uses.

These and other deficiencies exist. Accordingly, there is a need to provide individuals and entities with an appropriate solution that overcomes these deficiencies to provide data security for users to verify their identity and authenticate transactions while increasing data security and reducing the risk of data exposure.

SUMMARY

Aspects of the disclosed technology include systems, methods, and computer-accessible mediums for chip-based identity verification and transaction authentication. Various embodiments describe systems, methods, and computer-accessible mediums for using chips, such as the chips found in cards and telephones, to perform identity verification and transaction verification.

Embodiments of the present disclosure provide an identity verification system comprising: an application comprising instructions for execution on a user device, the user device including a memory, a processor, and a card chip insertion slot; and a server, wherein the application is configured to: prompt a removal of a card chip, prompt an insertion of the card chip into the user device, determine an orientation of the card chip after the insertion of the card chip into the user device, transmit, to the card chip, a first message, wherein the card chip is configured to encrypt the first message via one or more authentication protocols to generate an encrypted first message, and transmit, to the server, the encrypted first message; wherein the server is configured to: decrypt the encrypted first message, verify the decrypted first message, and transmit a second message to the application; and wherein the application is configured to display a verification notification in response to the second message.

Embodiments of the present disclosure provide a method of verifying identity comprising: prompting, by an application comprising instructions for execution on a user device, an insertion of a card chip into the user device, wherein the user device includes a processor, a memory, and a card chip insertion slot; determining, by the application, an orientation of the card chip after insertion of the card chip into the card chip insertion slot; transmitting, by the application to the card chip, a first message; receiving, by the application, an encrypted first message, wherein the encrypted first message is encrypted by one or more authentication protocols; transmitting, by the application to a server, the encrypted first message; and receiving, by the application from the server, a verification confirmation.

Embodiments of the present disclosure provide a non-transitory computer-accessible medium storing instructions that, when executed by a processor, cause the processor to: prompt a removal of a card chip; prompt an insertion of the card chip into a card chip insertion slot of a user device; determine an orientation of the card chip after the insertion of the card chip into the card chip insertion slot; transmit, to the card chip, a first message, wherein the first message includes at least one selected from the group of user device information, transaction information, and card chip information; receive, from the card chip, an encrypted first message, wherein the encrypted first message comprises the first message encrypted by one or more authentication protocols; transmit the encrypted first message for verification; receive a second message indicative of an outcome of the verification, wherein the second message comprises one or more access privileges; display a verification notification in response to the verification confirmation; and access information subject to at least one of the one or more access privileges.

Further features of the disclosed design, and the advantages offered thereby, are explained in greater detail hereinafter with reference to specific example embodiments illustrated in the accompanying drawings.

DETAILED DESCRIPTION OF EXAMPLE EMBODIMENTS

Figure 1:
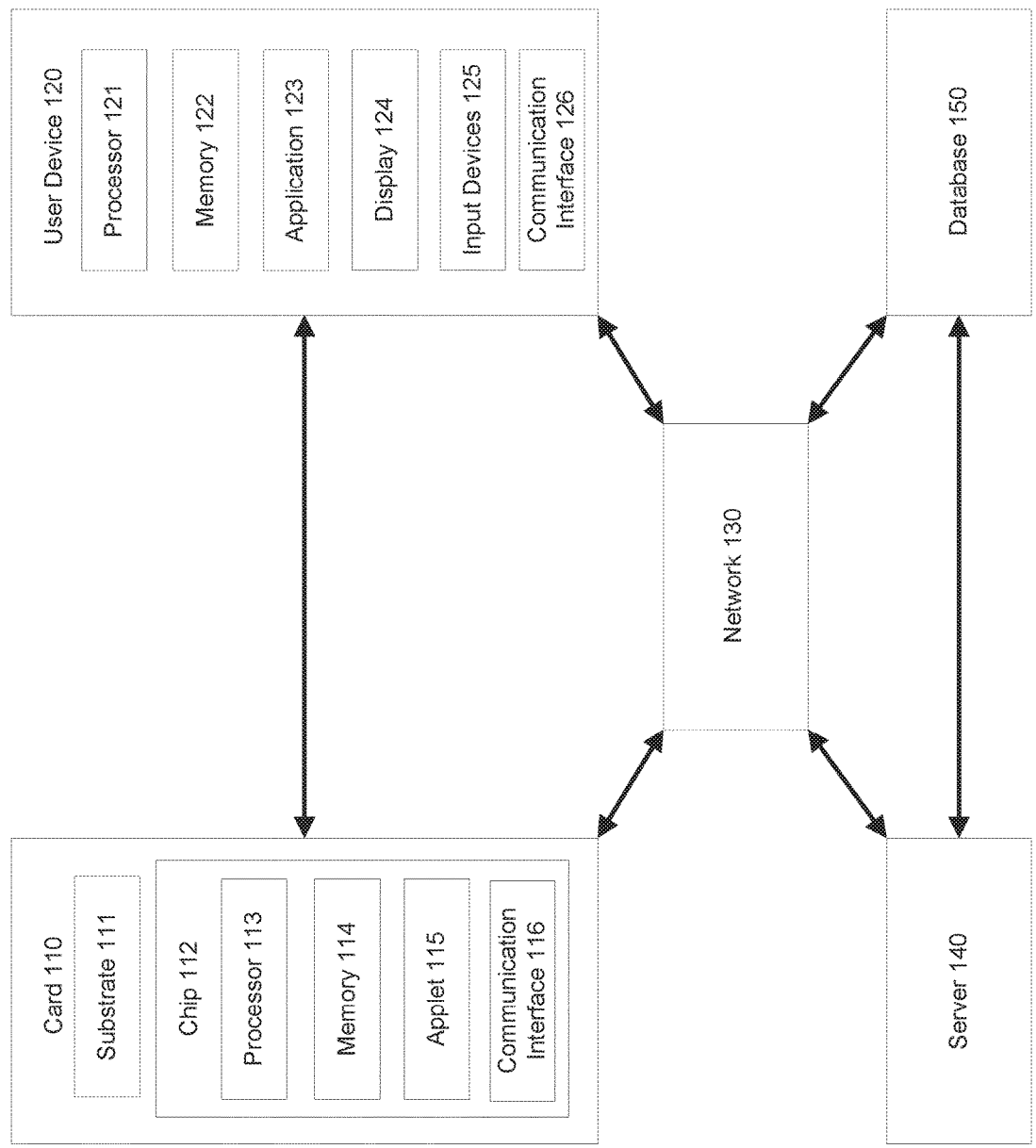
FIG. 1 illustrates an identity verification and transaction authentication system according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Example embodiments of the present disclosure provide systems, methods, and computer-accessible mediums that promote data security, such as for private information, and transaction security. As used herein, private information can include any sensitive data, including financial data (e.g., account information, account numbers, account balances, account activity), personal information (e.g., Social Security number, home or work address, birth date, telephone number, email address, passport number, driver's license number, an identification number), login credentials (e.g., passwords, security codes, authorization codes, biometric data, security questions, answers to security questions), and any other information that user can desire to avoid revealing to unauthorized persons. By restricting the transmission of private information while still verifying user identity and authenticating transactions, example embodiments of the present disclosure can reduce the risk that private information is compromised when it is being sent, stored, or viewed. In addition, by reducing the occurrences when private information is sent, the odds of any unauthorized data exposure can be reduced. Access to private information can be subject to one or more access privileges. Exemplary access privileges can include, without limitation, a requirement that a user verify their identity, a requirement that a user authenticate a transaction before it takes place, a requirement that only users with verified identities access the private information, a requirement that only authenticated transactions can access the private information, a requirement for multifactor authentication, a requirement as to one or more particular forms of multifactor authentication, and a requirement that only particular users, particular merchants, or particular transactions access the private information. Once the requirements of an access privilege are met, access to the private information can be granted.

Further, many entities that handle sensitive private information or conduct transactions involving sensitive private information can benefit from effectively and efficiently verifying identities while reducing the risk of exposure that information. These benefits can include more effective and efficient compliance with "Know Your Customer" (KYC) regulations, improving the likelihood that identities, information, and transactions can be trusted. For example, financial institutions, insurers, and other entities can expend significant resources complying with KYC regulations and other fraud prevention tasks, and these resource expenditures can be reduced through the improved systems, methods, and computer-accessible media for data security, user identity verification, and transaction authentication described herein.

FIG. 1 illustrates an identity verification and transaction authentication system according to an example embodiment. As further discussed below, system 100 can include a card 110, a user device 120, a server 140 and a database 150 in communication via a network 130 or in communication directly with each other without utilizing network 130. Although FIG. 1 illustrates single instances of the components, system 100 can include any number of components.

As shown in FIG. 1, the system 100 includes a card 100. The card 110 can be a contact-based card or a contactless card. A contact-based card can include a magnetic stripe or a chip configured to communicate with a physical interface, such as by swiping through a card swipe interface or inserting into a card chip reader found on an automated teller machine (ATM) or other device configured to communicate over a physical interface. Exemplary other devices can include, without limitation, a mobile device, tablet, laptop computer, desktop computer, wearable device, kiosk, cash register, and payment terminal including a card swipe interface or a card chip reader or in communication with an external card swipe interface or card chip reader (e.g., via universal serial bus or other cable or a wireless data connection between the swipe interface or card reader and the device). A contactless card can communicate to a card reading device without the need for a physical interface. Instead, the contactless card can communicate with a contactless card reader or other device having a contactless communication interface. Exemplary other devices can include, without limitation, a mobile device, tablet, laptop computer, desktop computer, wearable device, a kiosk, a cash register, a payment terminal, and another contactless card. In some examples, the contactless card can communicate via near field communication (NFC), Bluetooth, Wi-Fi, radio-frequency identification (RFID), and other forms of wireless communication. Additional example embodiments of a card are described with reference to FIGS. 3A and 3B.

The card 100 may comprise a substrate 111, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the card 100 may have physical characteristics compliant with the ID-1 format of the ISO/IEC 7810 standard, and the card may otherwise be compliant with the ISO/IEC 14443 standard. However, it is understood that the card 100 according to the present disclosure may have different characteristics, and the present disclosure does not require the card 100 to be implemented in a payment card.

The card 100 can include a chip 112. The chip 112 can be any type of chip, such as a computer chip or a Europay, Mastercard, Visa (EMV) chip. As shown in FIG. 1, the chip can include a processor 113, a memory 114, an applet 115, and a communication interface 116.

The processor 113 can be a processor, a microprocessor, or other processor, and the card 110 can include one or more of these processors. The processor 113 can include processing circuitry, which can contain additional components, including additional processors, memories, error and parity/CRC checkers, data encoders, anti-collision algorithms, controllers, command decoders, security primitives and tamper-proofing hardware, as necessary to perform the functions described herein.

The processor 111 can be coupled to the memory 114. The memory 114 can be a read-only memory, write-once read-multiple memory or read/write memory, e.g., RAM, ROM, and EEPROM, and card 110 can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it can not be rewritten, but it can be read many times. A read/write memory can be programmed and re-programed many times after leaving the factory. It can also be read many times. The memory 114 can be configured to store one or more software applications and one or more applets, such as applet 115, and other data, such as private information.

The applet 115 can comprise one or more applets (e.g., Java Card applets) and/or one or more software applications comprising instructions for execution on the card 110. In some examples, card 110 can execute one or more applets or one or more applications that enable, for example, network communications with one or more components of system 100, transmit and/or receive data, and perform the functions described herein. Upon execution by the processor 113, the application 115 can provide the functions described in this specification, specifically to execute and perform the steps and functions in the process flows described herein. Such processes can be implemented in software, such as software modules, for execution by computers or other machines. The applet 115 can provide graphic user interfaces (GUIs) through which users can view and interact with other components and devices within system 100. The GUIs can be formatted, for example, as web pages in HyperText Markup Language (HTML), Extensible Markup Language (XML) or in any other suitable form for presentation on a display device depending upon applications used by users to interact with the system 100.

The communication interface 116 can include communication capabilities with physical interfaces and contactless interfaces. For example, the communication interface can communicate with a physical interface, such as by swiping through a card swipe interface or inserting into a card chip reader found on an automated teller machine (ATM) or other device configured to communicate over a physical interface. In other examples, the communication interface 116 can establish contactless communication with a card reading device via a short-range wireless communication method, such as NFC, Bluetooth, Wi-Fi, RFID, and other forms of contactless communication. As shown in FIG. 1, the communication interface 116 can communicate directly with the user device 120 or communicate with user device 120, server 140, and database 150 via network 150.

As shown in FIG. 1, the system 100 further includes a user device 120. The user device 120 can be a network-enabled computer device. Exemplary network-enabled computer devices include, without limitation, including, a server, a network appliance, a personal computer, a workstation, a phone, a handheld personal computer, a personal digital assistant, a thin client, a fat client, an Internet browser, a mobile device, a kiosk, an automated teller machine (ATM), a cash register, or other a computer device or communications device. For example, network-enabled computer devices can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. In some examples, the user device can be a contact-based card or a contactless card.

The user device 120 can include a processor 121, a memory 122, an application 123, a display 124, input devices 125, and a communication interface 126. The processor 121 can be a processor, a microprocessor, or other processor, and the user device 105 can include one or more of these processors. The processor 121 can include processing circuitry, which can contain additional components, including additional processors, memories, error and parity/CRC checkers, data encoders, anti-collision algorithms, controllers, command decoders, security primitives and tamper-proofing hardware, as necessary to perform the functions described herein.

The processor 121 can be coupled to the memory 122. The memory 122 can be a read-only memory, write-once read-multiple memory or read/write memory, e.g., RAM, ROM, and EEPROM, and user device can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it can not be rewritten, but it can be read many times. A read/write memory can be programmed and re-programed many times after leaving the factory. It can also be read many times. The memory 122 can be configured to store one or more software applications, such as application 123, and other data, such as private information.

The application 113 can comprise one or more applets or one or more software applications comprising instructions for execution on the user device 105. In some examples, user device 120 can execute one or more applications, such as software applications, that enable, for example, network communications with one or more components of system 100, transmit and/or receive data, and perform the functions described herein. Upon execution by the processor 121, the application 123 can provide the functions described in this specification, specifically to execute and perform the steps and functions in the process flows described above. Such processes can be implemented in software, such as software modules, for execution by computers or other machines. The application 123 can provide graphic user interfaces (GUIs) through which user can view and interact with other components and devices within system 100. The GUIs can be formatted, for example, as web pages in HyperText Markup Language (HTML), Extensible Markup Language (XML) or in any other suitable form for presentation on a display device depending upon applications used by users to interact with the system 100.

The user device 120 can further include a display 124 and input devices 125. The display 124 can be any type of device for presenting visual information such as a computer monitor, a flat panel display, and a mobile device screen, including liquid crystal displays, light-emitting diode displays, plasma panels, and cathode ray tube displays. The input devices 125 can include any device for entering information into the user device 120 that is available and supported by the user device 120, such as a touch-screen, keyboard, mouse, cursor-control device, touch-screen, microphone, digital camera, video recorder or camcorder. These devices can be used to enter information and interact with the software and other devices described herein.

The communication interface 126 can include wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof. This network may include, without limitation, telephone lines, fiber optics, IEEE Ethernet 902.3, a wide area network, a local area network, a wireless personal area network, a wide body area network or a global network such as the Internet. The user device 120 can also support a short-range wireless communication interface, such as NFC, RFID, and Bluetooth, through communication interface 126, along with radio transmissions.

System 100 can include one or more networks 130. In some examples, network 130 can be one or more of a wireless network, a wired network or any combination of wireless network and wired network, and can be configured to connect card 110, user device 120, server 140, and database 150. For example, network 130 can include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 130 can include, without limitation, telephone lines, fiber optics, IEEE Ethernet 902.3, a wide area network, a wireless personal area network, a LAN, or a global network such as the Internet. In addition, network 130 can support an Internet network, a wireless communication network, a cellular network, or the like, or any combination thereof. Network 130 can further include one network, or any number of the exemplary types of networks mentioned above, operating as a stand-alone network or in cooperation with each other. Network 130 can utilize one or more protocols of one or more network elements to which they are communicatively coupled. Network 150 can translate to or from other protocols to one or more protocols of network devices. Although network 130 is depicted as a single network, it should be appreciated that according to one or more examples, network 130 can comprise a plurality of interconnected networks, such as, for example, the Internet, a service provider's network, a cable television network, corporate networks, such as credit card association networks, and home networks. Network 130 can further comprise, or be configured to create, one or more front channels, which can be publicly accessible and through which communications can be observable, and one or more secured back channels, which can not be publicly accessible and through which communications can not be observable.

In some examples, communications between card 110, user device 120, server 140, and database 150 via network 130 can occur via one or more front channels and one or more secure back channels. A front channel can be a communication protocol that employs a publicly accessible and/or unsecured communication channel such that a communication sent to card 110, user device 120, server 140, and/or database 150 can originate from any other device, whether known or unknown to card 110, user device 120, server 140, and/or database 150, if that device possesses the address (e.g., network address, Internet Protocol (IP) address) of card 110, user device 120, server 140, and/or database 150. Exemplary front channels include, without limitation, the Internet, an open network, and other publicly-accessible communication networks. In some examples, communications sent via a front channel can be subject to unauthorized observation by another device. In some examples, front channel communications can comprise Hypertext Transfer Protocol (HTTP) secure socket layer (SSL) communications, HTTP Secure (HTTPS) communications, and browser-based communications with a server or other device.

A secure back channel can be a communication protocol that employs a secured and/or publicly inaccessible communication channel. A secure back channel communication sent to card 110, user device 120, server 140, and/or database 150 cannot originate from any device, and instead can only originate from a selective number of parties. In some examples, the selective number of devices can comprise known, trusted, or otherwise previously authorized devices. Exemplary secure back channels include, without limitation, a closed network, a private network, a virtual private network, an offline private network, and other private communication networks. In some examples, communications sent via a secure back channel can not be subject to unauthorized observation by another device. In some examples, secure back channel communications can comprise Hypertext Transfer Protocol (HTTP) secure socket layer (SSL) communications, HTTP Secure (HTTPS) communications, and browser-based communications with a server or other device.

System 100 can further include a server 140. The server 140 can comprising one or more co-located or remote servers, and each server can include one or more processors coupled to memory. Server 140 may be configured as a central system, server, or platform to control and call various data at different times to execute a plurality of workflow actions. For example, the server 140 can be a dedicated server computer, such as a bladed server, or can be a personal computer, laptop computer, notebook computer, palm top computer, network computer, mobile device, or any processor-controlled device capable of supporting the system 100 and performing the functions described herein. Server 140 may be configured to connect to card 110, user device 120, and database 150 via network 130.

System 100 can further include a database 150. The database 150 may be one or more databases configured to store date, including without limitation, private information. The database 150 may comprise a relational database, a non-relational database, or other database implementations, and any combination thereof, including a plurality of relational databases and non-relational databases. In some examples, the database 150 may comprise a desktop database, a mobile database, or an in-memory database. Further, the database 150 may be hosted internally by the server 140 or may be hosted externally of the server 140, such as by another server, by a cloud-based platform, or by any storage device that is in data communication with the card 110, user device 120, and server 140, either directly or via network 130. In some examples, the database 150 can containing information relating to the card chip, the card, the user device, and one or more accounts associated with the card, the user device, and the user, including private information and encryption keys.

Figure 2:
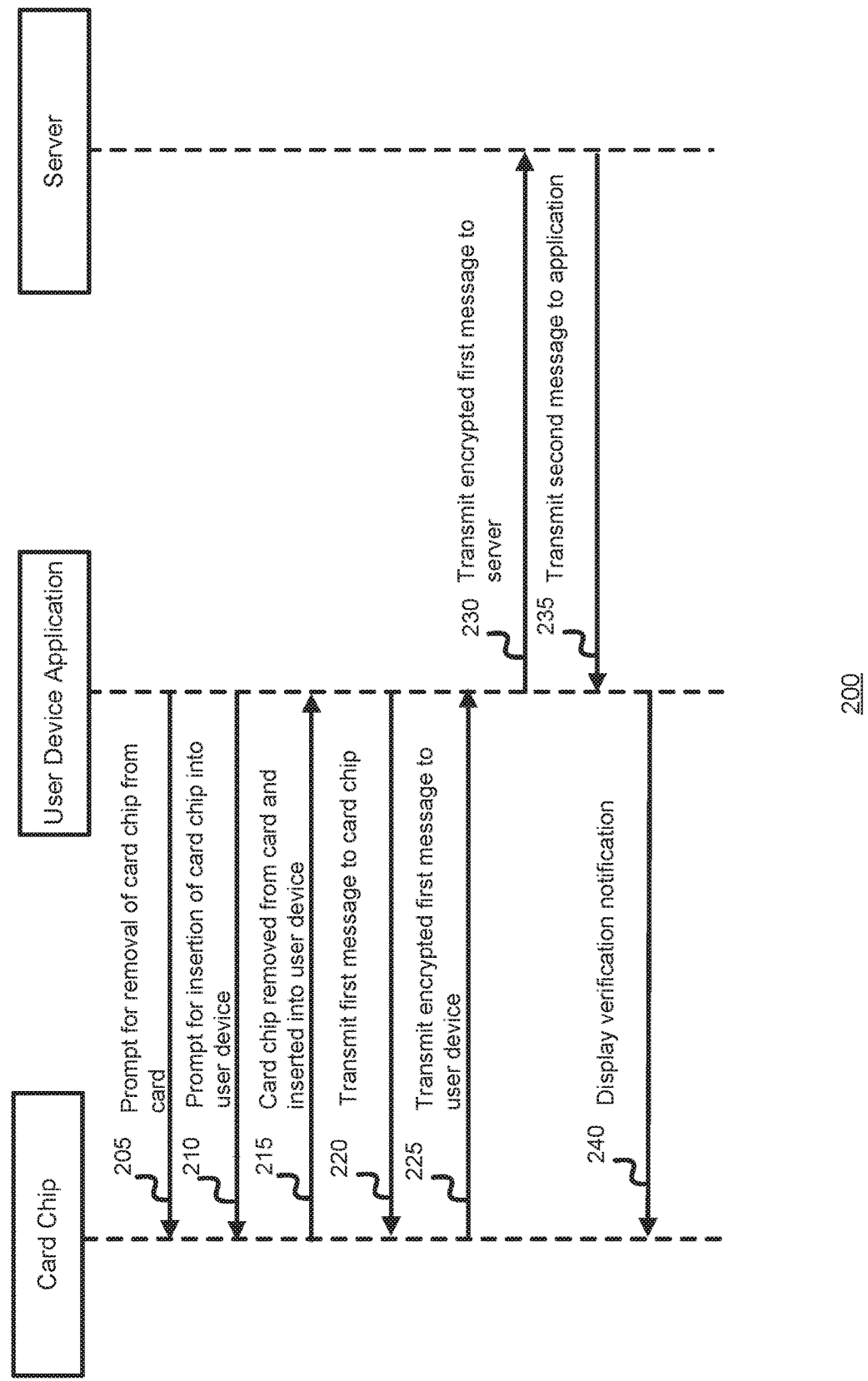
FIG. 2 illustrates a sequence diagram of a process 200 for user identity verification and transaction authentication according to an example embodiment.

FIG. 2 illustrates a sequence diagram of a process for user identity verification and transaction authentication according to an example embodiment. FIG. 2 can reference the same or similar components as those illustrated in other figures.

The process 200 can commence at step 205, where the application, which may be one or more applets and/or one or more software applications comprising instructions for execution on a user device, can prompt a user to remove a card chip from a card. The prompt may be delivered in one or more ways, including without limitation, by a visual notification (e.g., a display, notification, pop-notification, or other message presented on a display or other output device of the user device and/or other device associated with the user), an audible notification (e.g., a ring tone, vibration, alert, or alarm presented via an output device of the user device and/or other device associated with the user), a message sent to an address or phone number associated with the user (e.g., a text message, multimedia message, telephone call, or email). In some examples, the prompt can include instructions for removing the card chip from the card. The prompt can further include a request that the user confirm that the card chip has been removed from the card by, e.g., pressing a button, clicking a link, or sending a responsive message.

The application can generate the prompt for a variety of reasons. For example, a user associated with the card can initiate a transaction requiring identity verification and transaction authentication, or a transaction requiring an increased level of identity verification and transaction authentication than what was previously provided. Other non-limiting examples include a request by a user associated with the user device to perform an identity verification and/or transaction authentication of the user associated with the card, an instruction received by the application from a merchant, vendor, or other third party involved in a transaction with the user or an account associated with the card, an instruction sent to the application in response to a transaction, a requirement for an electronic signature, a requirement for cross-platform messaging and/or advertising, a requirement for a multi-factor identity verification, a requirement for a multifactor transaction authentication and any other activity requiring an identity verification and/or transaction authentication.

In some examples, a multifactor authentication can include the submission by a user of one or more forms of private information. This can be in response to prompts presented to the user (e.g., a request for entry of a user name/password, a request for entry of an identification number, or a security question requesting entry of an answer). In addition, a multifactor authentication can include a request for the submission of a biometric input, including without limitation a facial scan, a retina scan, a fingerprint, and a voice input for voice recognition.

The user associated with the card can be the same user associated with the user device, however, the present invention is not limited thereto. It is understood that a first user can be associated with the card and a second user can be associated with the user device, and in some examples, the second user can seek to verify the identity and/or authenticate a transaction involving the first user through the use of the card chip in connection with the user device. The second user can be an individual, a merchant, retailer, or other commercial or industrial entity, or an employee thereof, or any other entity seeking to perform an identity verification and/or transaction authentication.

In some examples, the card chip can be removed manually, e.g., by the user using one or more fingers. In other examples, one or more tools may be used, including without limitation, pliers tweezers, wire cutters, scissors, clippers, picks, pliers, pins, threads, needles, blades, knives, or any other structure, or any combination thereof, configured to remove the card chip from the card. The application of heat, torque, or other forces, alone or in combination with manual removal or removal tools, can also be used. Additional example embodiments of the removal of card chip from the card and insertion of the card chip into the user device are illustrated in FIGS. 4A through 4D.

In step 210, the application can prompt for the insertion of the card chip into the user device. This prompt can be made in one or more of the ways discussed above in step 205, and can be made in the same way or in a different way as utilized in step 210. In some examples, the prompt can include instructions for inserting the card chip into the user device.

Once the card chip is inserted into the user device, in step 215, the application can be configured to determine if the card chip has been properly inserted into the user device (e.g., correct orientation, correct alignment, functional data transfer). The application can also be configured to determine whether the card chip was previously inserted in a card or another user device. In some examples, the application can be configured to execute one or more of the applets and/or software applications stored on the card chip. In some examples, the application can be configured to selectively execute one or more of the applets and/or software applications stored on the card chip if the application determines the card chip was previously inserted in a card (e.g., an EMV applet). In other examples, the application can be configured to selectively execute one or more of the applets and/or software applications stored on the card chip if the application determines the card chip was previously inserted in a user device (e.g., a communication applet). If the application determines the card chip has not been correctly inserted, the application can display one or more additional instructions, iteratively if necessary, to facilitate the correct insertion of the card chip.

In step 220, the application can transmit a first message to the card chip. The first message can contain at least one selected from the group of user device information, transaction information, and card chip information. User device information can include information identifying the user device or otherwise associated with the user device, including a device identification number, network identification associated with the user device, a phone number, an account number, a user name, and a device name. Transaction information can include information relating or associated with a transaction, including an account number a password, a user name, login credentials, a transaction amount, an identification of the nature of the transaction (e.g., payment, funds transfer, purchase), an identification of the goods or services involved in the transaction, and instructions for the transaction (e.g., transfer a certain dollar amount from one account to another). In some examples, the transaction information can be historical data, such as previous transactions including the most recent transaction. Card chip information can include information stored on the card chip memory or in any applets stored by the card chip, such as identifying information (e.g., a user's name, password, account number, unique user identification, unique card identifier, private key) that can be used to identify the card chip and/or to identify the card chip as associated with the user.

In step 225, the card chip can be configured to encrypt the first message using one or more cryptographic algorithms. This encryption can be performed using asymmetric encryption and/or symmetric encryption. Exemplary cryptographic algorithms include, without limitation, Diffie-Hellman, Rivest Shamir Adleman (RSA), E1 Gamal, ECC3DES, AES128, AES256, hash-based message authentication code algorithms (e.g., HMAC-SHA-256), cipher-based message authentication code algorithms (e.g., AES-CMAC), and block cipher-based message authentication code algorithms (e.g., CBC-MAC). In some examples, the encryption can be performed using one or more private keys, which can be unique to a user, unique to an account associated with the user, and/or unique to the card. In some examples, an asymmetric encryption implementation can include the card chip using a stored private key algorithm and a shared public key algorithm accessible to the application and the card chip. Once encrypted, the encrypted first message can then be transmitted by the card chip to the application. In some examples, the encrypted first message can be sent as part of an identity verification and/or transaction authorization, and in other examples, the encrypted first message can be sent as an individual transaction.

In some examples, the encryption techniques described with reference to step 225 can be used by the application to the first message transmitted by the application to the card chip in step 220. In these examples, asymmetric encryption and/or symmetric encryption can be used. The use of encryption techniques can increase the security of step 220 in the same manner as step 225.

In step 230, the application can transmit the encrypted first message to the server via a network. In other examples, the card can transmit the encrypted first message to the server via a network that does not include the application or user device, or the application can be in direct data communication with the network. Upon receipt of the encrypted first message, the server can decrypt the encrypted first message and verify the decrypted first message. In some examples, the server can be in communication with one or more databases containing information relating to the card chip, the card, the user device, and one or more accounts associated with the card, the user device, and the user, including private information and encryption keys.

In step 235, the server can send a second message to the application. The second message can indicate whether the verification of the first message was successful or not successful. Upon receipt of the second message, in step 240, the application can display a verification notification. For example, if the second message indicates that the verification was successful, the verification notification can state one or more selected from the group of a message stating that identity verification is successful, a message stating that a transaction authentication is successful, a message stating that a transaction is approved, a message stating a request for further user authentication (e.g., additional factor(s) of authentication required), and a message stating that a multifactor authentication is successful (in examples where this process is applied as part of a multifactor authentication). In another example, if the second message indicates that the verification was unsuccessful, the verification notification can state one or more selected from the group of a message stating that identity verification is unsuccessful, a message stating that a transaction authentication is unsuccessful, a message stating that a transaction is disapproved, a message stating a request for further user authentication (e.g., additional factor(s) of authentication required), and a message stating that a multifactor authentication is unsuccessful (in examples where this process is applied as part of a multifactor authentication). In some examples, the second message can include a request for further user authentication.

In some examples, upon completion of step 240 the card chip can be removed from the user device and reinserted into the card. In these examples, the application can display instructions for removal of the card chip from the user device and for reinsertion of the card chip into the card. In other examples, the card chip can remain inserted into the user device for further activities, such as additional identity verification and transaction authentication according to the present disclosure, as well as to complete one or more transactions (e.g., one or more EMV transactions). In these examples, the card chip can comprise additional applets (e.g., an EMV applet) that can be executed using one or more components of the user device to complete one or more transactions. The application can be configured to execute the applets stored on the card chip and the card chip can also be configured to execute the applets with power supplied by the application and user device.

In some examples, steps 220 and 225 can be replaced with a known authentication protocol, such as the EMV protocol. This can promote compatibility and integration of the process 200 for a variety of uses where these authentication protocols are known. This can be useful for example embodiments where the card chip is an EMV chip and/or contains an EMV applet.

Figure 3A:
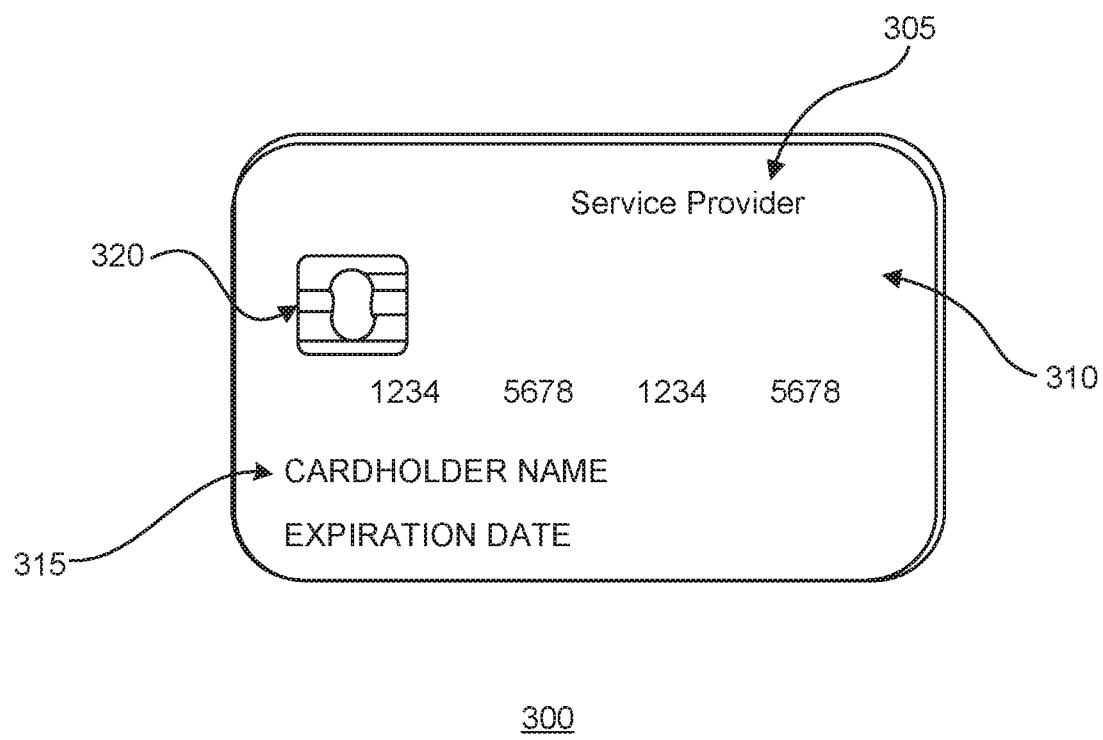
FIGS. 3A and 3B illustrate a card according to an example embodiment.
Figure 3B:
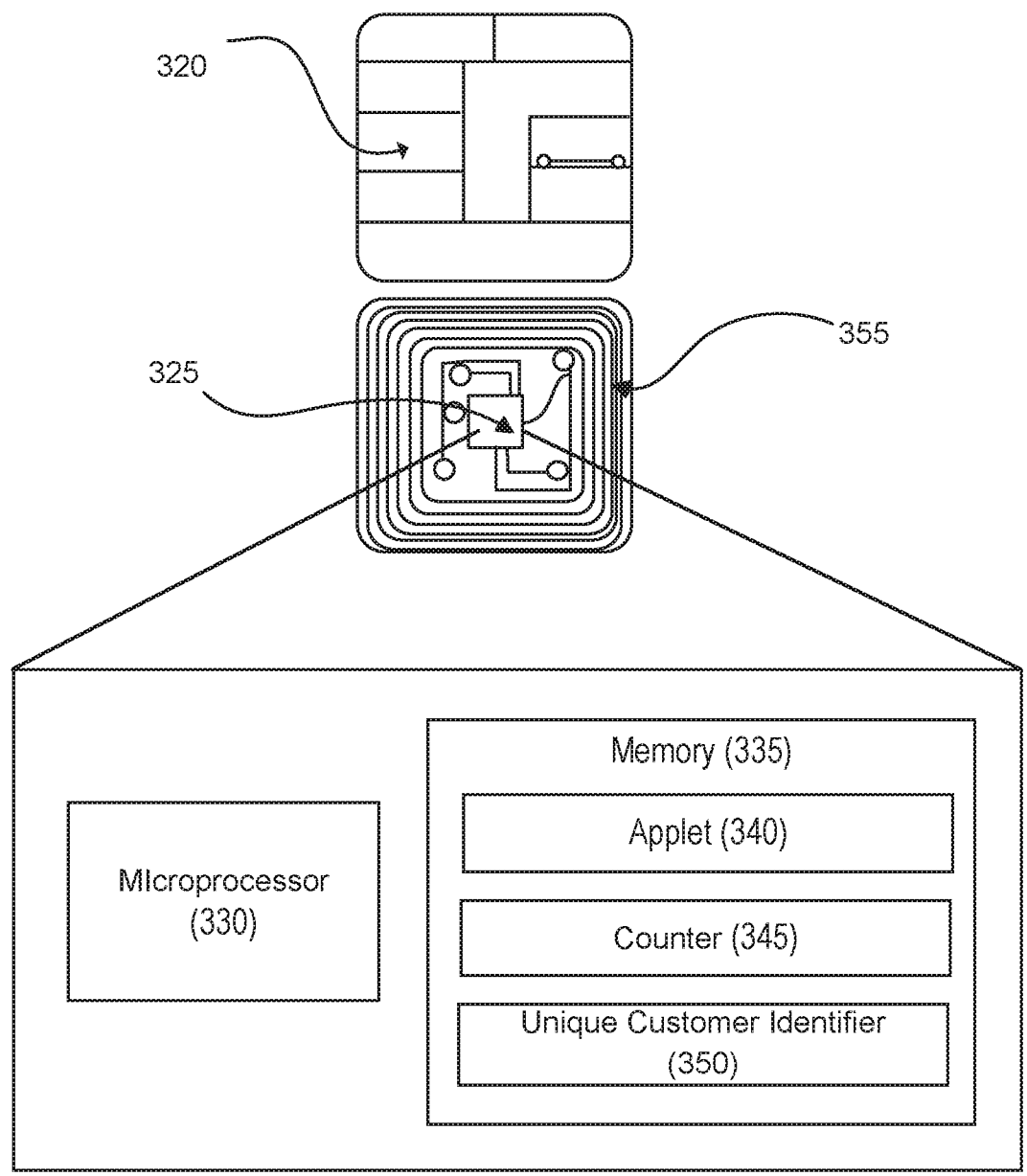

FIGS. 3A and 3B illustrate a card according to an example embodiment. In some examples, the illustrated card can be a contact-based card, and in other examples the illustrated card can be a contactless card. FIGS. 3A and 3B can reference the same or similar components as those illustrated in other figures.

FIG. 3A illustrates an exterior view of a card 300 according to an example embodiment. In some examples, the card 300 can be a payment card, such as a credit card, debit card, or gift card, issued by an identified service provider 305 displayed on the front or back of the card 300. The card 300 can be formed of a substrate 310, which can include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In an embodiment, the card 300 can have physical characteristics compliant with the ID-1 format of the ISO/IEC 7810 standard, and the card 300 can otherwise be compliant with the ISO/IEC 14443 standard. However, it is understood that a card according to the present disclosure can have different characteristics, and the present disclosure does not require a card to be implemented in a payment card.

The card 300 can also include identification information 315 displayed on the front and/or back of the card, and a contact pad 320. The identification information can include, without limitation, an account number, a cardholder name, an expiration date, a card verification value, a security code, account management information, and a telephone number. In some examples, the contact pad 320 can function as a communication interface and can establish contact with another device, such as a smart phone, laptop, desktop, tablet computer, kiosk, ATM, and a card reader. The card 300 can also include processing circuitry, antenna and other components not shown in FIG. 3A. These components can be located behind the contact pad 320 or elsewhere on the substrate 310. The card 300 can also include a magnetic stripe or tape, which can be located on the back of the card (not shown in FIG. 3A).

FIG. 3B illustrates an exploded view of the contact pad 320 of card 300 according to an example embodiment. As shown in FIG. 3B, the contact pad 320 can include processing circuitry 325 for storing and processing information, including a microprocessor 330 and a memory 335. It is understood that the processing circuitry 325 can contain additional components, including processors, memories, error and parity/CRC checkers, data encoders, anticollision algorithms, controllers, command decoders, security primitives and tamperproofing hardware, as necessary to perform the functions described herein.

The memory 335 can be a read-only memory, write-once read-multiple memory or read/write memory, e.g., RAM, ROM and EEPROM, and a card 300 can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it cannot be rewritten, but it can be read many times. A read/write memory can be programmed and re-programed many times after leaving the factory. It can also be read many times.

The memory 335 can store an applet 340, a counter 345, and a customer identifier 350. The applet 340 can be one or more software applications intended to execute on smart cards, such as Java Card applets. However, it is understood that the applet is not limited to Java Card applets, and instead can be any software application operable on smart cards or other devices having limited memory. The counter 340 can be a numeric counter sufficient to store an integer. The customer identifier 355 can be a unique alphanumeric identifier assigned to the user of the card 300, and this identifier can distinguish the user of the card 300 from all other card users. In some examples, the customer identifier 350 can identify both the customer and an account assigned to that customer and can further identify the specific card 300 associated with the customer's account. In some examples, the customer identifier 350 can include one or more encryption keys, such as a one or more public keys and/or one or more private keys.

The memory 335 can be divided into several zones, with each zone having a different level of security. The microprocessor 330 can keep track of which memory addresses belong to which zones and the circumstances under which each zone can be accessed. In an example embodiment, the memory 335 can be divided into four zones: a secret zone, a confidential zone, a usage zone, and a public zone.

A secret zone can be used for storage of information which can be used only by the microprocessor 330, e.g., passwords and cryptographic keys. The information stored in this zone is not readable outside of the smart card. In an embodiment, the secret zone can be implemented with a separate processor that is capable of performing cryptographic functions. Cryptographic keys can be passed in to the secret zone or can be generated in the secret zone, and in either case the keys can be stored in the secret zone and used to support cryptographic services. If necessary, cryptographic keys can be exported from the secret zone.

A confidential zone can be used to store a list of all transactions made with the card. The confidential zone can have password protection. In an example embodiment, the password is known only to the card issuer, who can examine the history of the card for evidence of misuse of the system. The confidential zone can have a read-only access restriction so that the information stored in this zone could not be modified, e.g., transaction list could not be modified. In another embodiment, the applet 340 and any associated memory can be firewalled from other applets stored on the card 300. In this embodiment, the applet 340 can handle the sending or receiving of any information.

A usage zone could be used for storage of information which can be periodically updated or modified. Depending on the sensitivity of the data, a password can be implemented for this zone. The usage zone can have both read and write access protected by a password.

A public zone can be used for keeping non-sensitive information, such as the card issuer's name and address, or the counter 345. The public zone can have read-only access, without a password.

The processor and memory elements of the foregoing exemplary embodiments are described with reference to the contact pad, but the present disclosure is not limited thereto. It is understood that these elements can be implemented outside of the pad or entirely separate from it, or as further elements in addition to processor and memory elements located within the contact pad.

As shown in FIG. 3B, the card 300 can include an antenna 355. In some examples, the antenna 355 can be placed within the card 300 and around the processing circuitry 325 of the contact pad 320. For example, the antenna 355 can be integral with the processing circuitry and the antenna 355 can be used with an external booster coil. As another example, the antenna 355 can be external to the contact pad 320 and the processing circuitry 325.

In an embodiment, the coil of card 300 can act as the secondary of an air core transformer. The terminal can communicate with the card 300 by cutting power or amplitude modulation. The card 300 can infer the data transmitted from the terminal using the gaps in the smart card's power connection, which can be functionally maintained through capacitors. The card 300 can communicate back by switching a load on the smart card's coil or load modulation. Load modulation can be detected in the terminal's coil through interference.

FIGS. 4A, 4B, 4C, and 4D illustrate a removal of a card chip from a card and the insertion of the card chip into a user device according to an example embodiment. FIGS. 4A, 4B, 4C, and 4D can reference the same or similar components as those illustrated in other figures.

Figure 4B:
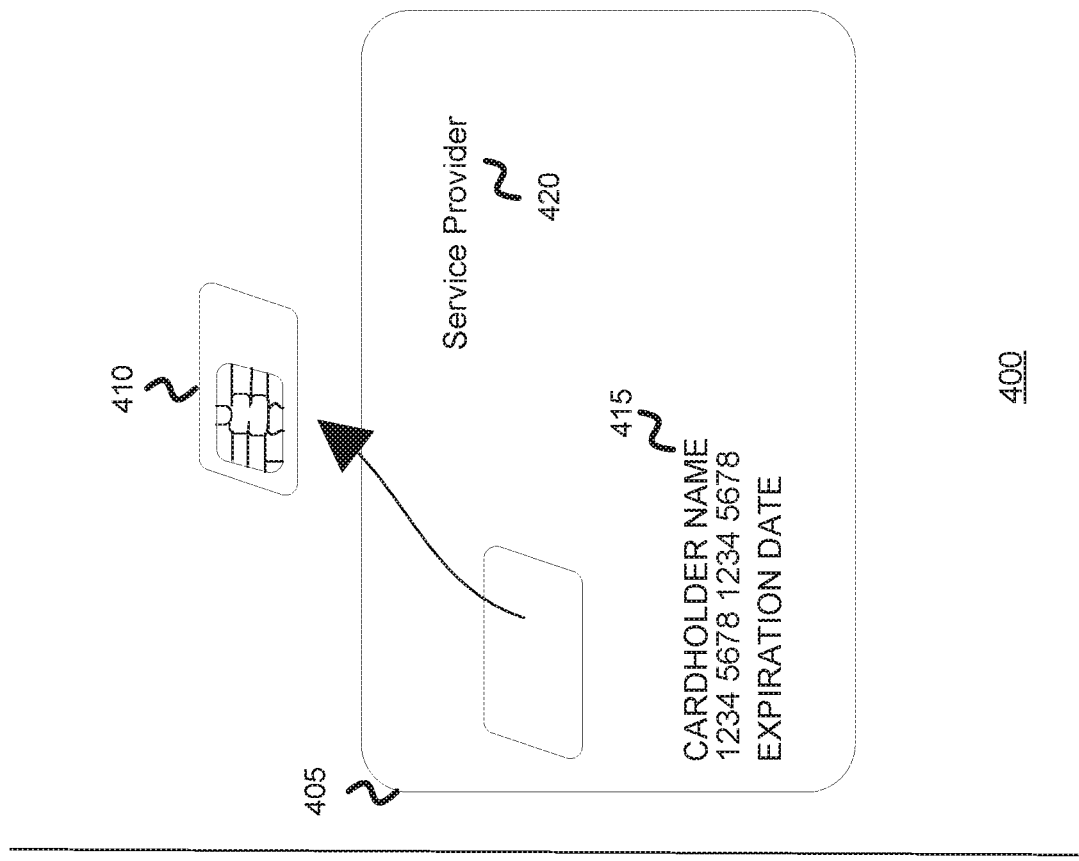
FIGS. 4A, 4B, 4C, and 4D illustrate a removal of a card chip from a card and the insertion of the card chip into a user device according to an example embodiment.
Figure 4A:
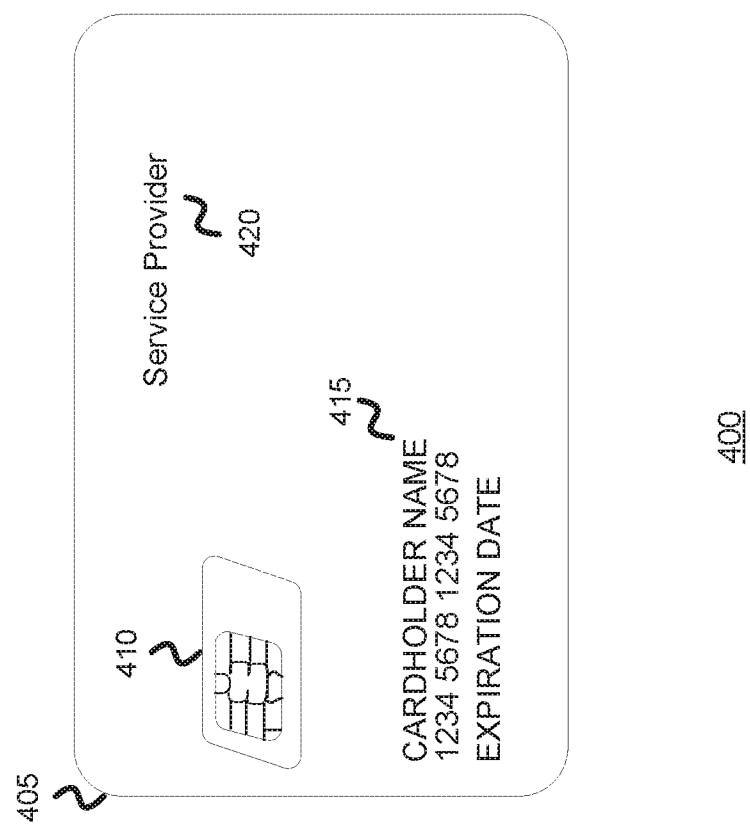

FIG. 4A illustrates a card having a card chip according to an example embodiment. As shown in FIG. 4A, a card 400 can comprise a substrate 405, a card chip 410, identification information 415, and an identified service provider 420. The card 400 can be a contact-based card or a contactless card, and in some examples the card 400 can be the same or similar to the cards illustrated in other figures. The card chip 410 illustrates the card chip 410 as embedded in the substrate 405, but it is understood that the present disclosure is not limited thereto, and card chip 410 can be inserted into, affixed, or otherwise attached to the substrate 405 in any manner.

FIG. 4B illustrates the removal of a card chip from a card according to an example embodiment. As shown in FIG. 4B, the card chip 410 has been removed from the substrate 405. In some examples, the card chip 410 can be removed manually (e.g., by the user using one or more fingers) and in other examples tools may be used alone on or in combination with one or more fingers. Exemplary tools, include without limitation, pliers tweezers, wire cutters, scissors, clippers, picks, pliers, pins, threads, needles, blades, knives, or any other structure, or any combination thereof, configured to remove the card chip from the card. The application of heat, torque, or other forces, alone or in combination with manual removal or removal tools, can also be used. Removal of the card chip 410 can be performed in accordance with instructions provided by an application comprising instructions for execution on a user device.

Additional exemplary processes for removal of the card chip 410 can include, without limitation, at least one selected from the group of a push button process, a latched slide process, an adhesive process, and a snap process. For example, a push button process for removal of the card chip 410 can include pushing one or more buttons to release the card chip 410 from substrate 405. In these examples, the push button process can be used to release to the card chip 410 from the substrate 405. In some examples, the push button process can result in the ejection of the card chip 410 from the substrate 405, and in other examples the push button process can facilitate the removal of the card chip 410 from the substrate 405 manually and/or using one or more tools. The push buttons can be located on the card 400 or can be pushed on a user device or other device in data communication with the card 400.

As another example, removal of the card chip 410 can include a latched slide process. In this process, the card chip 410 can be latched to a slide or other movable card holder within the substrate 405. The slide can be moved away from or outside of the substrate 405 on one or more rails and the card chip 410 can be unlatched. Once the card is unlatched, the slide can be returned to its starting position or left in place in preparation for the return of the card chip 410. Alternatively, the slide can be completely removed from the one or more rails and the substrate 405 while still containing the card chip 410 and placed on a second set of one or more rails for insertion into the user device via a chip insertion slot. In another alternative embodiment, the card chip 410 can be unlatched and removed from the slide connected to the substrate 405 and latched to a second slide connected to a second set of one or more rails connected to the user device. The second slide can facilitate insertion of the card chip 410 into a chip insertion slot of the user device As another example, the card chip 410 can be removed from the substrate 405 using an adhesive process. In this process, the card chip 410 can be affixed to the substrate 405 by one or more re-applicable adhesives, such as epoxies, cyanoacrylates, urethanes, acrylic adhesives, and any combination thereof. The one or more re-applicable adhesives can be in various forms, such as liquids, pastes, resins, powders, films, and any combination thereof. In order to remove the card chip 410 from the substrate 405, the adhesive hold can be broken by physically pulling the card chip 410 away from the substrate 405 or by dissolving the adhesives with a solution. One or more adhesives can be re-applied to re-affix the card chip 410 to the substrate 405. In all examples, all adhesives, solutions, and other materials used can be sufficiently non-toxic so as to not damage the card chip 410, the substrate 405, other components of the card 400 when used once and when used multiple times.

As another example, the card chip 410 can be removed by a snap process. In this process, the card chip 410 can be snapped into and snapped out of substrate 405. The card chip 410 can be snapped into the substrate 405 in a manner that is accessible to the user for purposes of snapping the card chip 410 out of the substrate 405. In some examples, the card chip 410 can be snapped into a tray, slide, or other container or holder for insertion and removal, in order to facilitate accessibility and the secure placement of the card chip 410 within the substrate 405. FIG. 4B illustrates an exemplary embodiment of the card chip 410 when snapped out of the substrate 405.

Figure 4C:
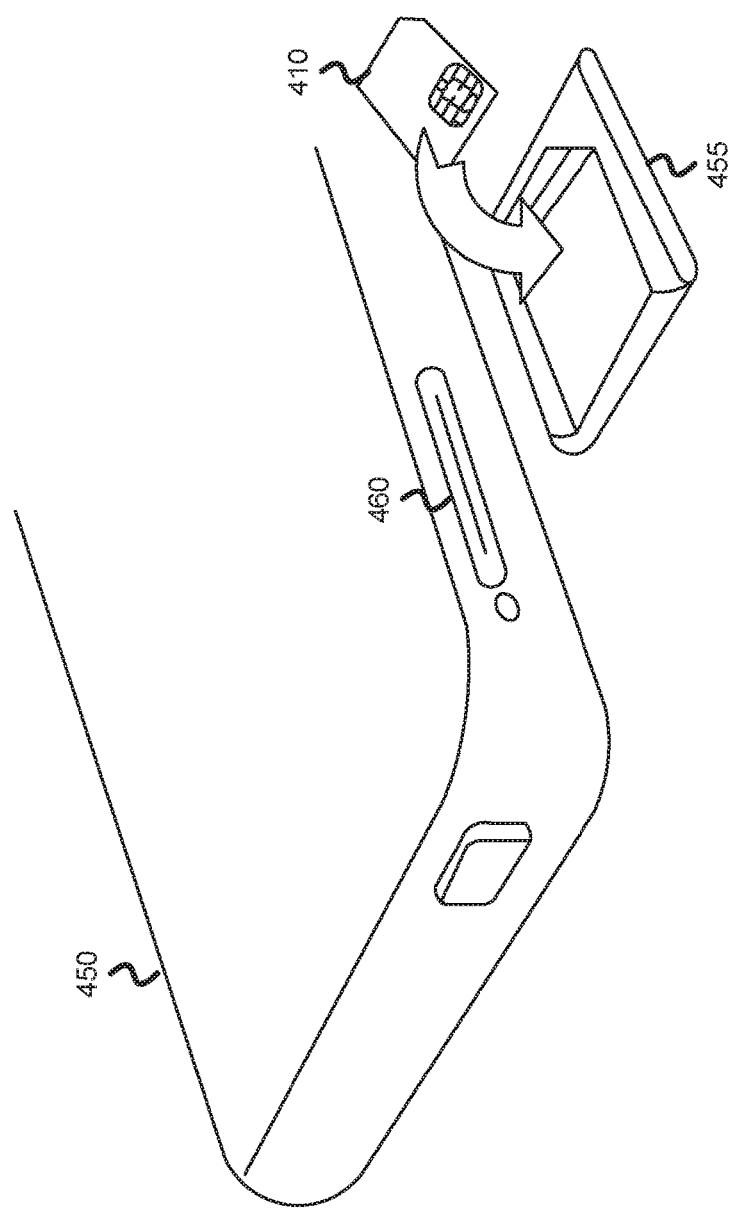

FIG. 4C illustrates preparation for an insertion of a card chip into a user device according to an example embodiment. As shown in FIG. 4C, the card chip 410 can be prepared for insertion into a user device 450. In some examples, the user device 450 can be a network-enabled computer device. In other examples, the user device 450 can be a contact-based card or a contactless card. The preparation can include properly orienting the card chip 410 for insertion into the user device 420. As shown in FIG. 4C, the card chip 410 can be inserted into a chip tray 455 in preparation for insertion into a chip slot 460. The chip tray 455 can be configured for receipt of the card chip 410 and for insertion into the chip slot 460 once the card chip 410 has been received. Prior to insertion into the chip tray 455, the card chip 410 can be properly oriented, such that the card chip 410 is aligned for proper insertion into card tray 455, aligned for proper insertion of the chip tray 455 with card chip 410 into chip slot 460, and further aligned for proper reading by user device 450 once insertion is completed. In some examples, the chip tray 455 can configured for use in the push button process, latched slide process, adhesive process, and snap process described herein. In some examples, the card chip 410 can comprise a subscriber identity module (SIM) card chip, the chip tray 455 can comprise a SIM card chip tray, and the chip slot 460 can comprise a SIM card slot.

Figure 4D:
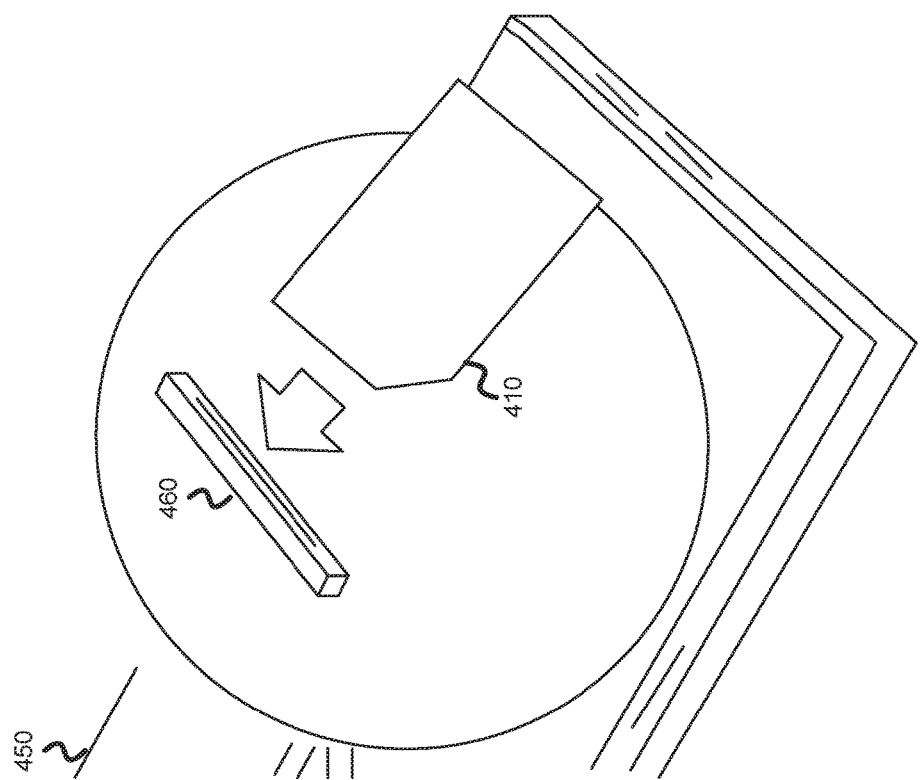

FIG. 4D illustrates an exploded view of an insertion of a card chip into a user device according to an example embodiment. As shown in FIG. 4D, the card chip 410 can be properly oriented into the chip slot 460 of the user device 450. This insertion can be performed manually or in connection with one or more tools. In some examples, the insertion can be performed with one or more of the methods described herein and can include the use of one or more fingers and/or one or more tools.

As previously discussed, the card chip 410 can be removed from the user device 450 and returned to the card 400. Reversing the examples illustrated in FIGS. 4A through 4D can illustrate an example embodiment of this process.

Figure 5:
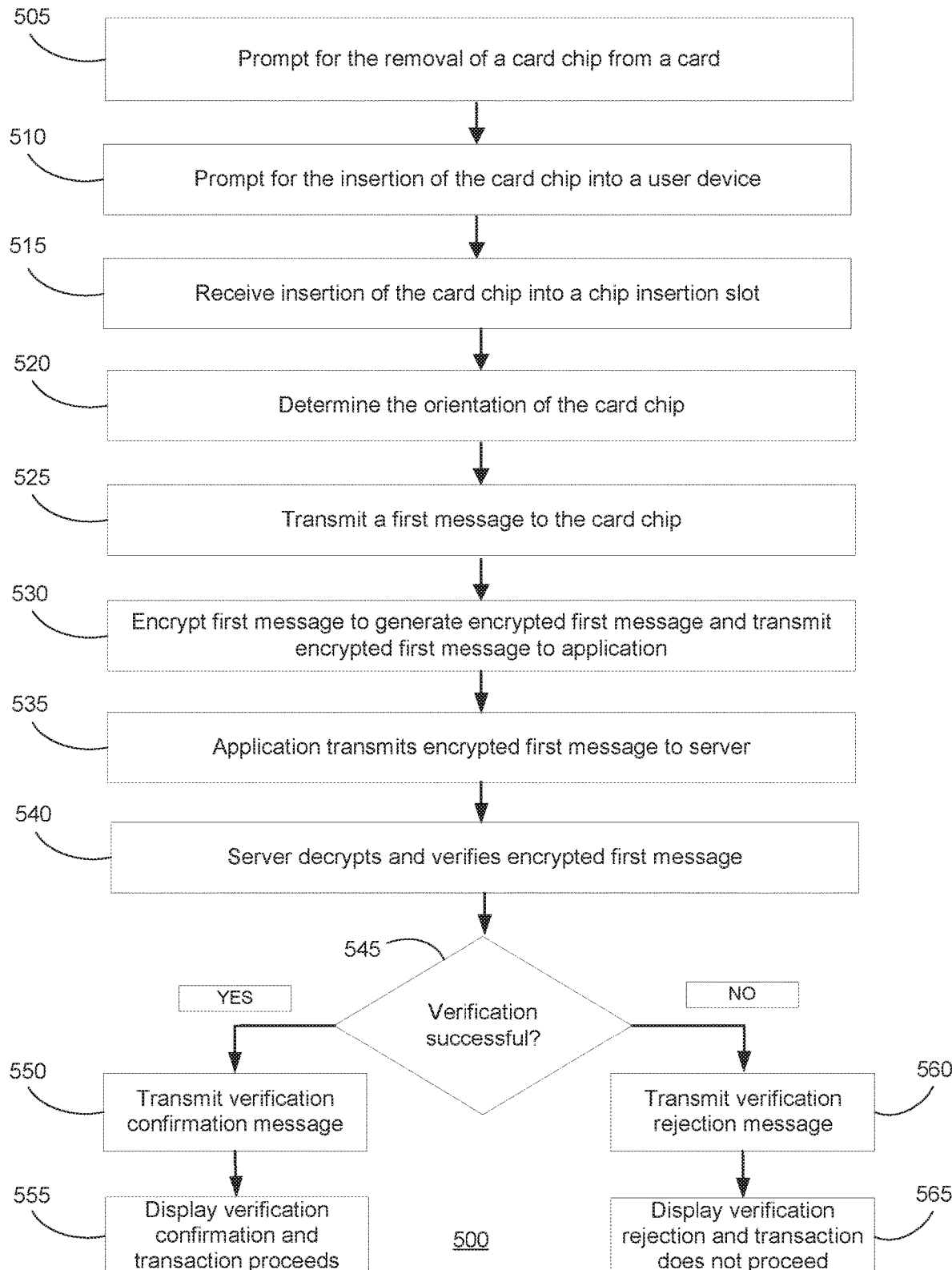
FIG. 5 is a flow chart illustrating a method of card chip removal, insertion, and identity verification and transaction authentication according to an example embodiment.

FIG. 5 is a flow chart illustrating a method of card chip removal, insertion, and identity verification and transaction authentication according to an example embodiment. FIG. 5 can reference the same or similar components as those illustrated in other figures.

As shown in FIG. 5, the method 500 can commence at block 505, where an application comprising instructions for execution on a user device (e.g., one or more software applications and/or applets) can prompt a user to remove a card chip from the card. The prompt can be generated for one or more reasons, such as the need for identity verification, the need for transaction authentication, a transaction requiring an increased level of identity verification and/or transaction authentication, receipt of a request from a merchant, vendor, or other third party involved in a transaction with the user or an account associated with the card, receipt of an instruction sent to the application in response to a transaction, a requirement for an electronic signature, a requirement for cross-platform messaging and/or advertising, a requirement for a multi-factor identity verification, a requirement for a multifactor transaction authentication and any other activity requiring an identity verification and/or transaction authentication. The prompt can be at least one selected from the group of a visual notification, an audible notification, and a message sent to an address or phone number associated with the user. In some examples, the prompt can include instructions for removing the card chip from the card. The prompt can further include a request that the user confirm that the card chip has been removed from the card by, e.g., pressing a button, clicking a link, sending a message, or responding to a received message.

In block 510, the application can prompt for the insertion of the card chip into the user device. This prompt can be at least one selected from the group of a visual notification, an audible notification, and a message sent to an address or phone number associated with the user. In some examples, prompt can be generated in response to the user's confirmation that the card chip has been removed from the card. In some examples, the prompt can include instructions for inserting the card chip into the user device. In some examples, the prompt can request confirmation from the user that the card chip has been inserted, however, in other examples an insertion of the card chip can be automatically detected.

In block 515 the card chip can be inserted into the user device. In some examples, the card chip can be inserted into a user device via a card chip insertion slot. In some examples, the user can confirm that the card chip has been inserted into the user device by, e.g., pressing a button, clicking a link, sending a message, or responding to a received message.

In block 520, the application can determine if the inserted card chip is in a proper orientation and if the card chip has been otherwise correctly inserted. This can be indicated by, e.g., checking for a correct orientation, checking for a correct alignment, and establishing functional data transfer. The application can also be configured to determine whether the card chip was previously inserted in a card or another user device. In some examples, the application can be configured to execute one or more of the applets stored on the card chip. In some examples, the application can be configured to selectively execute one or more of the applets stored on the card chip if the application determines the card chip was previously inserted in a card (e.g., an EMV applet). In some examples, the application can be configured to selectively execute one or more of the applets stored on the card chip if the application determines the card chip was previously inserted in a user device (e.g., a communication applet). In some examples, the application can be configured to selectively execute one or more of the applets stored on the card chip for purposes of step-up authentication in instances where step-up authentication is required. In some examples, the application can store an instruction on the card chip that step-up authentication should be required upon the next insertion of the card chip. This can be done if the card chip has been or will be involved in a sensitive transaction or as a general measure to increase security. If the application determines the card chip has not been correctly inserted, the application can display one or more additional instructions, iteratively if necessary, to facilitate the correct insertion of the card chip.

Upon determining in block 520 that the card chip has been properly inserted, the method 500 can proceed to block 525. In block 525, a first message can be generated by the application and transmitted by the application to the card chip. The first message can be, for example, a bit string of any length. The size of the first message can be adjusted as necessary based on the memory available, the amount of information included, and other factors. For example, if a symmetric cryptographic technique requires a theoretical maximum key space and maximum message space, the first message can be sized within those requirements.

In block 530, upon receipt of the first message the card chip can be configured to encrypt the first message using one or more cryptographic algorithms. This encryption can be performed using asymmetric encryption and/or symmetric encryption. Exemplary cryptographic algorithms include, without limitation, Diffie-Hellman, Rivest Shamir Adleman (RSA), E1 Gama1, ECC3DES, AES128, AES256, hash-based message authentication code algorithms (e.g., HMAC-SHA-256), cipher-based message authentication code algorithms (e.g., AES-CMAC), and block cipher-based message authentication code algorithms (e.g., CBC-MAC). In some examples, the encryption can be performed using one or more private keys, which can be unique to a user, unique to an account associated with the user, and/or unique to the card. In some examples, an asymmetric encryption implementation can include the card chip using a stored private key algorithm and a shared public key algorithm accessible to the application and the card chip. Once encrypted, the encrypted first message can then be transmitted by the card chip to the application. In some examples, the encrypted first message can be sent as part of an identity verification and/or transaction authorization, and in other examples, the encrypted first message can be sent as an individual transaction. Once encrypted, the card chip can transmit the encrypted first message to the application.

In some examples, the encryption techniques described with reference to block 525 can be used by the application to the first message transmitted by the application to the card chip in block 520. In these examples, asymmetric encryption and/or symmetric encryption can be used. The use of encryption techniques can increase the security of block 520 in the same manner as block 525.

In block 535, upon receipt of the encrypted first message, the application can transmit the encrypted first message to a server via a network. In block 230, the application can transmit the encrypted first message to the server via a network. In other examples, the card chip can transmit the encrypted first message to the server via a network that does not include the application or user device, or the application can be in direct data communication with the network.

Upon receipt of the encrypted first message, in block 540 the server can decrypt the encrypted first message and verify the decrypted first message. The verification can be performed as appropriate for the asymmetric encryption and/or symmetric encryption techniques utilized in prior blocks.

In block 545, the server can determine whether the verification has been successful. If so, the method 500 can proceed to block 550 where a verification confirmation message can be sent by the server to the application. The verification confirmation message can indicate that the verification has been successful (e.g., a successful identity verification, a successful transaction authentication), and cause the method 500 to proceed to block 555, where the application can display a verification confirmation notification. The verification notification can state one or more selected from the group of a message stating that identity verification is successful, a message stating that a transaction authentication is successful, a message stating that a transaction is approved, a message stating a request for further user authentication (e.g., additional factor(s) of authentication required), and a message stating that a multifactor authentication is successful (in examples where this process is applied as part of a multifactor authentication. In examples where no further user authentication is required, the transaction can proceed and reach completion. In examples where further user authentication is required, this can be requested, provided, and evaluated prior to the transaction proceeding (if the further authentication is successful) and reach completion.

Returning to block 545, if the server determines that the verification is unsuccessful, the method 500 can proceed to block 560 where a verification rejection message can be sent by the server to the application. The verification rejection message can indicate that the verification has been unsuccessful (e.g., an unsuccessful identity verification, an unsuccessful transaction authentication), and cause the method 500 to proceed to block 555, where the application can display a verification rejection notification. The verification notification can state one or more selected from the group of a message stating that identity verification is unsuccessful, a message stating that a transaction authentication is unsuccessful, a message stating that a transaction is unapproved, a message stating a request for further user authentication (e.g., additional factor(s) of authentication required), and a message stating that a multifactor authentication is unsuccessful (in examples where this process is applied as part of a multifactor authentication). In some examples, further user authentication can be required in view of the unsuccessful verification in order for the transaction to proceed. In examples where further user authentication is required, this can be requested, provided, and evaluated prior to the transaction proceeding (if the further authentication is successful) and reaching completion.

Figure 6:
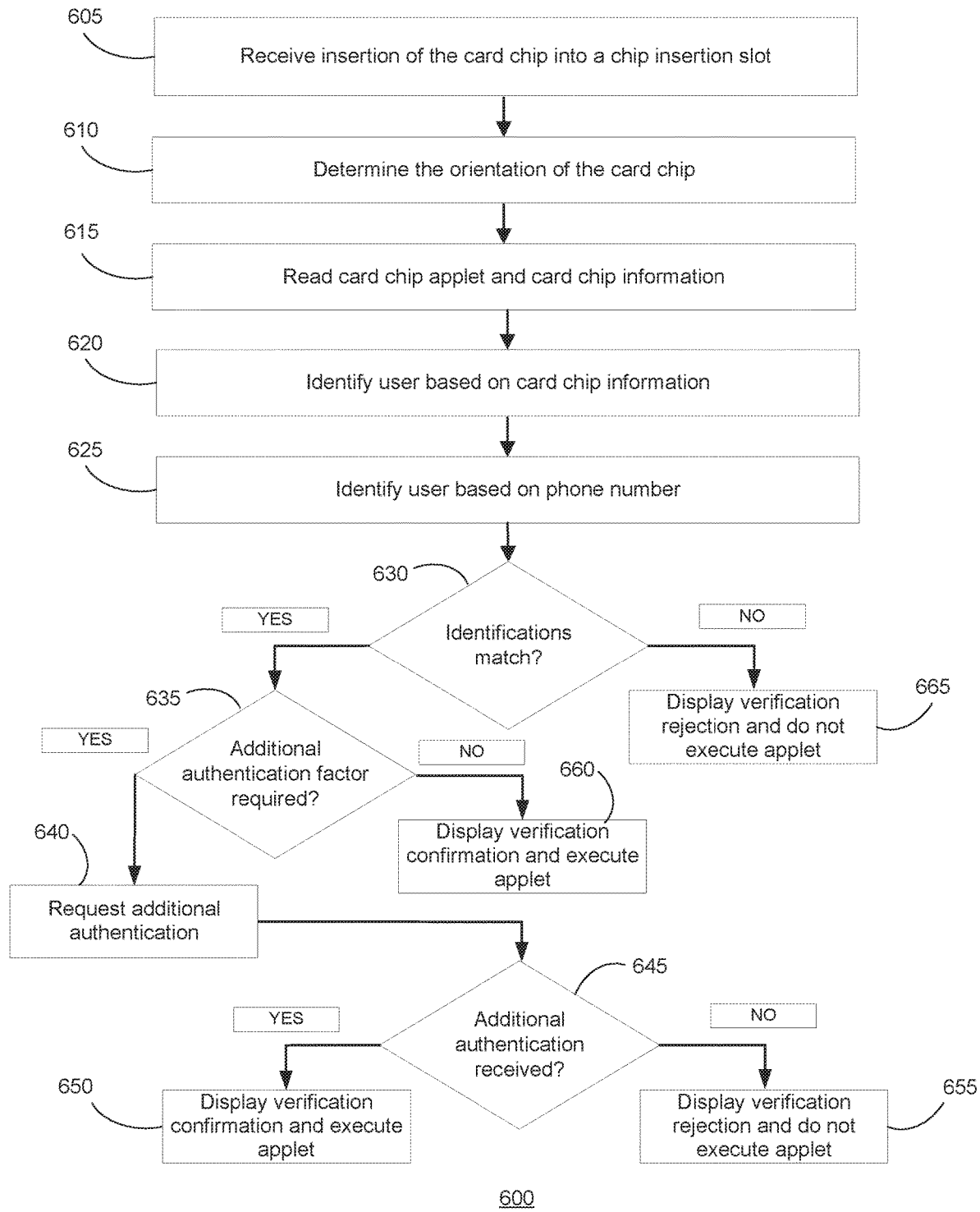
FIG. 6 is a flow chart illustrating a method of using a card chip according to an example embodiment.

FIG. 6 is a flow chart illustrating a method of using a card chip according to an example embodiment. FIG. 6 can reference the same or similar components as those illustrated in other figures.

As shown in FIG. 6, the method 600 can commence at block 605, where the card chip can be inserted into the user device. In some examples, the card chip can be inserted into a user device via a card chip insertion slot. In some examples, the user can confirm that the card chip has been inserted into the user device by, e.g., pressing a button, clicking a link, sending a message, or responding to a received message.

In block 610, an application comprising instructions for execution on a user device can determine if the inserted card chip is in a proper orientation and if the card chip has been otherwise correctly inserted. This can be indicated by, e.g., checking for a correct orientation, checking for a correct alignment, and establishing functional data transfer. The application can also be configured to determine whether the card chip was previously inserted in a card or another user device. If the application determines the card chip has not been correctly inserted, the application can display one or more additional instructions, iteratively if necessary, to facilitate the correct insertion of the card chip.

Upon determining that the card chip is correctly inserted, in block 615 the application can read the card chip and any applets stored thereon, and any information stored by the card chip. In some examples, the card chip can contain identifying information (e.g., a user's name, password, account number, unique user identification, unique card identifier, private key) that can be used to identify the card chip and/or to identify the card chip as associated with the user. This identifying information can be stored in a memory of the card chip or obtained from any applets stored by the card chip. Then, in block 620, the application can use this information to identify the user or an account associated with the user. In some examples, the application can identify the user by querying one or more databases with the identifying information. In some examples, the application can transmit the identifying information to a server for identification. In some examples, the application can identify the user based on information stored on the user device.

Once an identification of the user based on information stored by the card chip, the method 600 can proceed to block 625, where the application can identify the user based on a phone number. For example, the application can use a phone number associated with the user device to look up a user associated with the phone number by querying one or more databases. In other examples, the application can transmit the phone number to a server for identification. In some examples, where the card chip was previously inserted in a phone associated with the user (e.g., as a SIM card or as a chip card previously inserted into a phone associated with the user), the application can obtain the phone number from the card chip.

Then, in block 630, the identification of the user based on information stored by the card chip and the identification of the user based on the phone number can be compared. If the two identifications match, the method 600 can proceed to block 635, where the application can determine whether one or more additional authentication factors can be required. The application can determine whether additional authentication factors are required based on, for example, information stored on the card chip or within an applet stored on the card chip, based on an instruction received by a merchant or vendor associated with the card chip, an account associated with the user, the user device, and/or the application, and based on an instruction contained in the one or more databases and/or received from the server upon identification of the user. If one or more additional authentication factors are required, the method 600 can proceed to block 640 and request additional authentication. The one or more additional authentication factors can include, without limitation, entry of login credentials, account information, security information, biometric information and a combination thereof (e.g., entry of a user name, a password, an account number, a security code, a one-time passcode, an answers to a security question, a fingerprint, a facial scan, a retinal scan, and a voice recognition).

If the one or more additional authentication factors are received, the method 600 can proceed to block 650, where the application can display a verification can display a verification confirmation notification and one or more of the applets stored on the card chip can be executed. In some examples, the execution of one or more applets can result in the performance of one or more transactions, e.g., EMV transactions.

Returning to block 645, if no additional authentication information is received, the method 600 can proceed to block 655, where the application can display a verification rejection notification and the application will not execute any applets stored on the card chip. In some examples, the application can display instructions for removing the card chip from the user device.

Returning to block 635, if no additional authentication factors are required, the method 600 can proceed to block 660. In block 660, the application can display a verification confirmation notification and one or more of the applets stored on the card chip can be executed. In some examples, the execution of one or more applets can result in the performance of one or more transactions, e.g., EMV transactions.

Returning to block 630, if the identification of the user based on information stored by the card chip and the identification of the user based on the phone number do not match, the method 600 can proceed to step 665, where the application can display a verification rejection notification and the application will not execute any applets stored on the card chip. In some examples, the application can display instructions for removing the card chip from the user device.

In some examples, the method 600 can request one or more authentication factors prior to the insertion of the card chip into the user device or prior to reading the card chip once inserted into the user device. In some examples, this request for one or more authentications can be in addition to the request made in block 640, and in other examples, this request can replace the request made in block 640.

Throughout the specification, the present disclosure refers to a card or a chip card. It is understood that the present disclosure is not limited to a particular type of card, and instead the present disclosure includes any type of card having a chip. Exemplary cards include, without limitation, payment cards (e.g., credit cards, debit cards, gift cards), identity cards (e.g., driver's licenses, passports, tickets), membership cards, loyalty cards, access cards (e.g., employee identification cards, building security cards), account cards, data storage cards, and transportation cards (e.g., tickets, farecards, other travel documents).

Throughout the specification, the present disclosure refers to chips used in cards, however, the present disclosure is not limited thereto. It is understood that the present disclosure encompasses chips used in a variety of devices that include electronic components having chips, including without limitation computing devices (e.g., laptop computers, desktop computers, and servers), vehicles (e.g., automobiles, airplanes, trains, and ships), appliances (e.g., televisions, refrigerators, air conditioners, furnaces, microwaves, dish washers, smoke detectors, thermostats, and lights), mobile devices (e.g., smartphones and tablets), and wearable devices (e.g., smartwatches).

Throughout the specification, the present disclosure refers to a transaction. A transaction can involve a merchant or vendor, and merchant devices or vendor devices, which can include, without limitation, retail merchants and vendors and associated devices. However, it is understood that the present disclosure is not limited thereto, and that the present disclosure includes any type of merchant, vendor, or other entity involving in activities where private information is required. Exemplary merchants and vendors include, without limitation, financial entities (e.g., banks, lenders, brokerages, insurers), governmental institutions, educational institutions, commercial and industrial entities such as manufacturers and retailers, any entity acting as an employer, and individual persons.

In some examples, the present disclosure refers to a transaction, which can include, without limitation, a financial transaction. However, it is understood that the present disclosure is not limited thereto, and that the present disclosure includes any type of transaction, operation or activity where private information is required. Exemplary transactions include, without limitation, financial transactions (e.g., deposits, withdrawals, and transfers of funds, purchases or sale of stocks, bonds, and options), identity verification, education transactions (e.g., enrollment, request or release of academic records, tuition payments), residency verification, account transactions (e.g., account opening, account administration and management actions (password changes, personal identification number (PIN) changes, name changes, address changes, beneficiary changes, funds transfers), account closing), service transactions (e.g., initiating a service, paying for a service, terminating a service), and purchase transactions (initiating a purchase, authorizing a purchase, confirming a purchase, challenging a potentially unauthorized purchase, returning a purchase, declining a purchase, performing an age-restricted purchase, redeeming loyalty points or rewards). A transaction can also include a step-up authentication in support of one an operation or activity, including those listed above.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An identity verification system comprising:
an application comprising instructions for execution on a user device, the user device including a memory, a processor, and a card chip insertion slot; and
a server,
wherein the application is configured to:
prompt a removal of a card chip, wherein the prompt includes instructions for the removal of the card chip by a card chip removal process comprising:
dissolving an applied adhesive using a solution,
pushing a button to eject the card chip from the substrate,
moving a slide away from the substrate, and
unlatching the card chip from the slide,
prompt an insertion of the card chip into the user device,
determine an orientation of the card chip after the insertion of the card chip into the user device,
transmit, to the card chip, a first message, wherein the card chip is configured to encrypt the first message via one or more authentication protocols to generate an encrypted first message, and
transmit, to the server, the encrypted first message;
wherein the server is configured to:
decrypt the encrypted first message,
verify the decrypted first message, and
transmit a second message to the application; and
wherein the application is configured to display a verification notification in response to the second message.

2. The identity verification system of claim 1, wherein the application is configured to prompt the removal of the card chip in response to one or more transactions.

3. The identity verification system of claim 2, wherein the application is configured to complete the one or more transactions based on the verification message.

4. The identity verification system of claim 1, wherein the card chip insertion slot comprises a tray configured to receive the card chip.

5. The identity verification system of claim 1, wherein the card chip insertion slot comprises a subscriber identity module (SIM) slot.

6. The identity verification system of claim 1, wherein the first message contains at least one selected from the group of user device information, transaction information, and card chip information.

7. The identity verification system of claim 6, wherein at least one selected from the group of user device information, transaction information, and card chip information is matched with information accessible to the server for verification.

8. The identity verification system of claim 1, wherein the second message comprises one or more access privileges associated with private information.

9. The identity verification system of claim 8, wherein the application is further configured to access at least a portion of the private information in response to receipt of the one or more access privileges.

10. The identity verification system of claim 1, wherein the adhesive comprises at least one selected from the group of an epoxy, a cyanoacrylate, a urethane, and an acrylic adhesive.

11. A method of verifying identity comprising:
prompting, by an application comprising instructions for execution on a user device including a processor, a memory, and a card chip insertion slot, an insertion of a card chip into the user device, wherein the prompt includes [[an]] instructions for the removal of the card chip by a card chip removal process comprising:
dissolving an applied adhesive using a solution,
pushing a button to eject the card chip from the substrate,
moving a slide away from the substrate, and
unlatching the card chip from the slide;
determining, by the application, an orientation of the card chip after insertion of the card chip into the card chip insertion slot;
transmitting, by the application to the card chip, a first message;
receiving, by the application, an encrypted first message, wherein the encrypted first message is encrypted by one or more authentication protocols;
transmitting, by the application to a server, the encrypted first message; and
receiving, by the application from the server, a verification confirmation.

12. The method of verifying identity of claim 11, further comprising:
requesting, by the application, one or more multifactor authentication inputs,
wherein the one or more multifactor authentication inputs comprises at least one selected from the group of a password, an identification number, and a biometric input.

13. The method of verifying identity of claim 12, further comprising retrieving, by the application, identification data stored by the card chip as an auxiliary multifactor authentication input.

14. The method of verifying identity of claim 11, further comprising prompting, by the application, removal of the card chip.

15. The method of verifying identity of claim 11, wherein the card chip insertion slot comprises a tray configured to receive the card chip.

16. The method of verifying identity of claim 11, wherein the card chip insertion slot comprises a subscriber identity module (SIM) slot.

17. The method of verifying identity of claim 11, wherein the verification confirmation comprises one or more access privileges, the method further comprising:
accessing, by the application, information protected by the one or more access privileges in response to receipt of the verification confirmation.

18. A non-transitory computer-accessible medium storing instructions that, when executed by a processor, cause the processor to:
prompt a removal of a card chip, wherein the prompt includes instructions for the removal of the card chip by a card chip removal process comprising:
dissolving an applied adhesive using a solution,
pushing a button to eject the card chip from the substrate,
moving a slide away from the substrate, and
unlatching the card chip from the slide;
prompt an insertion of the card chip into a card chip insertion slot of a user device;
determine an orientation of the card chip after the insertion of the card chip into the card chip insertion slot;

transmit, to the card chip, a first message, wherein the first message includes at least one selected from the group of user device information, transaction information, and card chip information;

receive, from the card chip, an encrypted first message, wherein the encrypted first message comprises the first message encrypted by one or more authentication protocols;

transmit the encrypted first message for verification;

receive a second message indicative of an outcome of the verification, wherein the second message comprises one or more access privileges;

display a verification notification in response to the verification confirmation; and access information subject to at least one of the one or more access privileges.

19. The non-transitory computer-accessible medium of claim 18, wherein the card chip removal process further comprises snapping the card chip out of at least one selected from the group of a tray or the slide.

20. The non-transitory computer-accessible medium of claim 18, wherein the card chip removal process further comprises returning the slide to the substrate.

* * * * *